May 12, 1925.  
G. A. LUNZ  
ATTACHMENT FOR VEHICLES  
Filed June 14, 1924
1,537,243
2 Sheets-Sheet 2
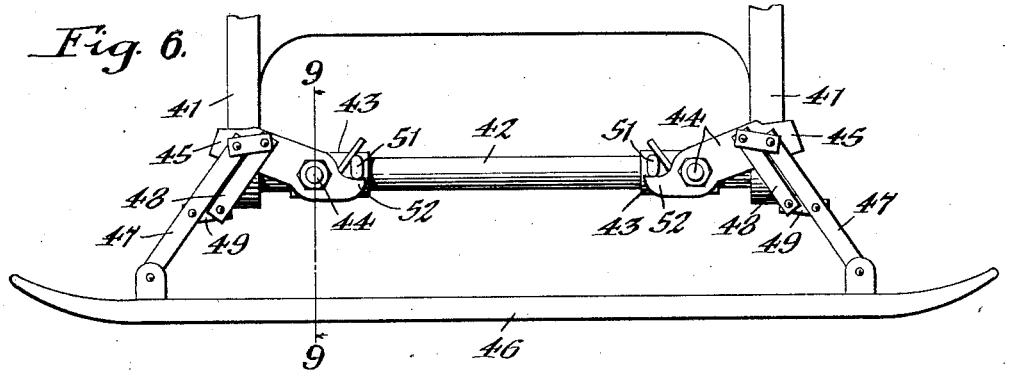
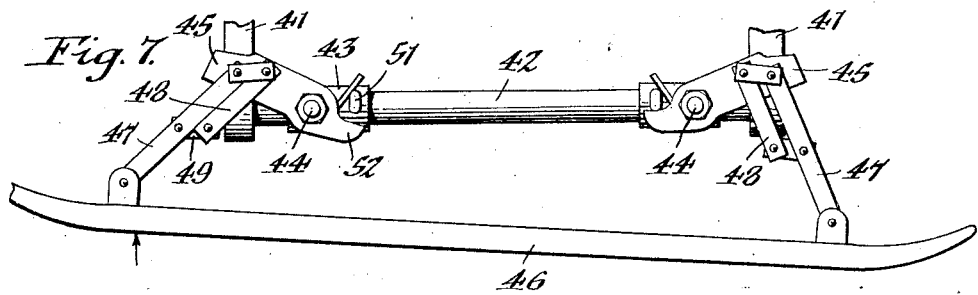
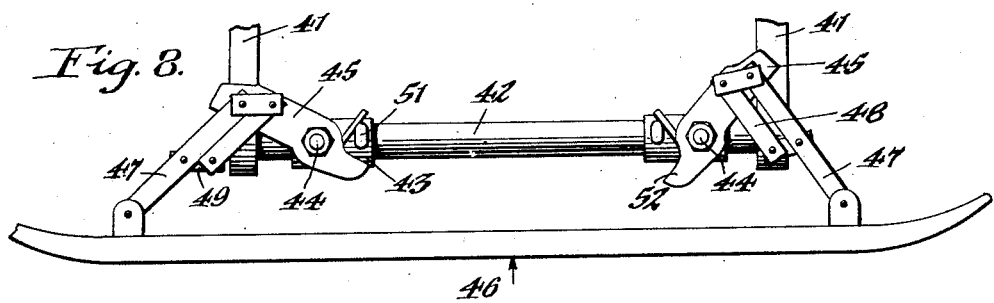
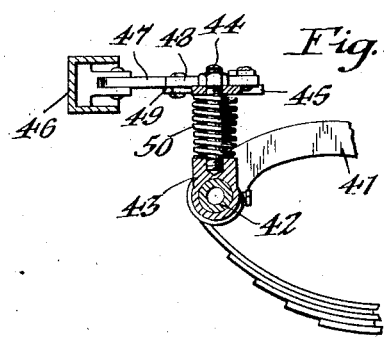
Inventor,
George A. Lunz,
by Geyer & Geyer
Attorneys.

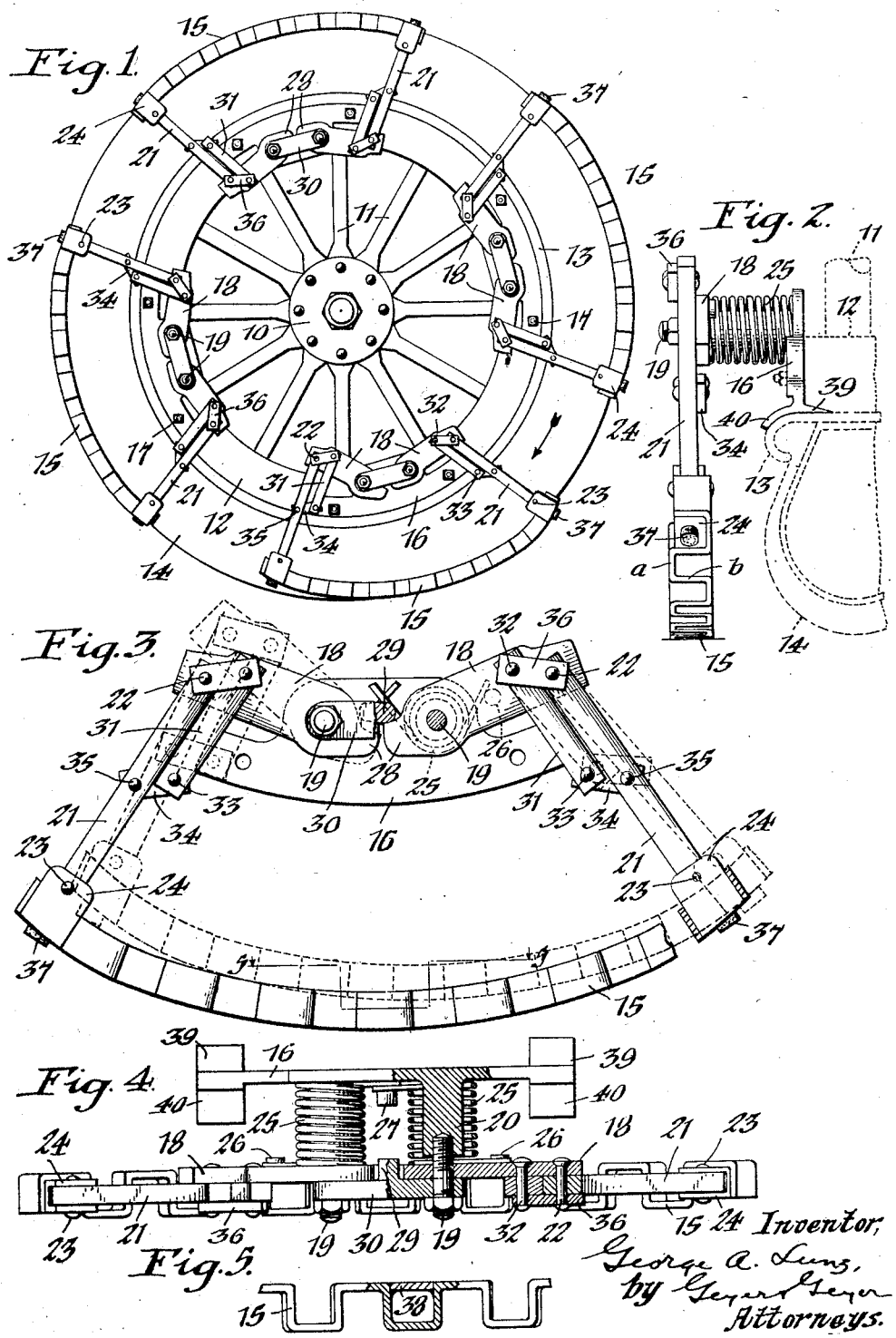

Patented May 12, 1925.

1,537,243

UNITED STATES PATENT OFFICE.

GEORGE A. LUNZ, OF BUFFALO, NEW YORK.

ATTACHMENT FOR VEHICLES.

Application filed June 14, 1924. Serial No. 720,124.

*To all whom it may concern:*

Be it known that I, GEORGE A. LUNZ, a citizen of the United States, residing at Buffalo, in the county of Erie and State of New York, have invented new and useful Improvements in Attachments for Vehicles, of which the following is a specification.

This invention relates generally to an attachment for automobiles but more particularly to a means for mounting or supporting the tread sections of a non-skidding device for the wheels of such vehicles or for flexibly connecting a bumper thereto.

Its chief object is to provide simple and improved means of this character which possesses the necessary flexibility to permit the tread sections to respond to the contracting and expanding movement of the tire when used in connection with a non-skid device, and which acts as a cushion and absorbs shocks when used in connection with a vehicle bumper.

Other objects of the invention are to provide a mounting which is strong and durable in construction, which is so organized and arranged that it can be readily assembled and dismembered, and which is reliable in operation and not liable to get out of order.

In the accompanying drawings:—Figure 1 is a side elevation of a vehicle wheel equipped with my improvement. Figure 2 is an enlarged end view of one of the anti-skidding units. Figure 3 is an enlarged sectional elevation of one of such units removed from the wheel. Figure 4 is a top plan view, partly in section, of one of the anti-skidding units. Figure 5 is a horizontal section on line 5—5, Fig. 3. Figure 6 is a top plan view of the improvement shown as a mounting for a vehicle bumper. Figures 7 and 8 are similar views showing the parts in different positions. Figure 9 is a cross section on line 9—9, Fig. 6.

Similar characters of reference indicate corresponding parts throughout the several views.

In the embodiment of the invention illustrated in Figs. 1-5 inclusive, the improvement is shown as a mounting for the tread sections of an anti-skidding attachment applied to a vehicle wheel, wherein 10 indicates the hub, 11 the spokes, 12 the felly, and 13 the customary rim for carrying the pneumatic or other suitable tire 14.

The anti-skidding attachment is preferably arranged on the outer side of the wheel and comprises a circular non-skidding tread or impact member 15 carried by a supporting member, ring or annular frame 16 removably secured to the felly by bolts 17 or other fastenings. This band is preferably composed of a plurality of independently-yielding segments or sections, four of such sections being shown in the drawings, each having a tread-edge of zig-zag, sinuous or crenulate form, thus presenting non-skid edges *a* and *b* running lengthwise and crosswise of the band, respectively, which increase the traction of the wheel and prevent its slipping or spinning on slippery roadways. The annular frame 16 may likewise be composed of a plurality of sections corresponding in number to those of the tread band.

Means are provided for yieldingly connecting each of the tread sections with its supporting section, and as shown in the drawings these means are preferably constructed as follows:

18, 18 indicate a pair of vertically-swinging rock levers, each fulcrumed on a stud bolt or pivot pin 19 secured to a boss 20 projecting horizontally from the front side of the respective supporting member 15. These rock levers are disposed side by side and extend in opposite directions, their free ends being pivotally connected by attaching arms 21, 21 with the corresponding ends of the tread section 15. The upper end of each attaching arm 21 is pivoted at 22 near the outer end of its lever 18 while the lower end thereof is pivoted at 23 to a bifurcated bearing-block 24 welded or otherwise permanently fastened to the tread section. Torsional springs 25 are applied to the fulcrum-bosses 20, one end of each spring engaging a projection 26 on the rear side of its companion lever, and the other end thereof bearing against a common lug 27 extending forwardly from the supporting member and located substantially centrally between said bosses. These springs function constantly to urge their rock levers to swing outwardly, such outward movement thereof being limited by their opposing inner arms 28, 28, abutting against the underside of a stop 29 carried by a tie-bar or plate 30 connecting the front ends of the bosses 20, as shown in Figs. 2 and 4. In the normal position of the tread sections on the tire, the springs 25 project them to a position slightly beyond the tread face of the tire, as shown at the top and sides in Fig. 1.

Disposed along the inner side of each attaching arm 21 and parallel therewith is a comparatively short arm 31 pivoted at its upper end, as shown at 32, to the corresponding rock lever 18, while its lower end is pivoted at 33 to a transverse link 34 pivoted at 35 to said arm 21 intermediate the ends thereof. The pivot points 22, 32 and 33, 35 are equidistant apart, so that the arms of each pair are always in parallel. In the normal position of each tread section, each pair of arms 21, 31 is practically closed with their contiguous longitudinal edges abutting against each other, or substantially so. Said arms 31 act to limit the outwardly swinging movement of the attaching arms 21, but allow the latter to swing inwardly. Whenever one of the levers 18 is rocked inwardly by reason of the radial movement of the respective tread section 15 caused by the same coming in contact with the roadway, its corresponding set of arms 21, 31 rock relatively thereto on their pivots and are separated, as shown at the lower end of Fig. 1 and by dotted lines in Fig. 3, while the companion lever is held against movement and its corresponding set of arms remain closed and are prevented from rocking or separating relatively to each other. By thus connecting the levers 18 with the ends of the respective tread sections, the latter are held against undue side-sway in a direction circumferentially of the wheel and are constantly urged in contact with the roadway to prevent skidding or spinning of the wheel. Aside from this function, these arms prevent lateral movement of the tread sections relative to the wheel during side skidding thereof. If desired, a reinforcing strap 36 may be provided which extends across the upper ends of each set of links.

Normally adjacent tread sections are separated to the necessary extent to prevent their coming in contact with each other during their radial movements. As shown in Fig. 1, the ends of the tread sections are preferably curved slightly inward and their bottom faces may be provided with contacts 37 of rubber or similar material, which may be secured in the blocks 24 and which act to deaden the noise when said sections contact with the roadway.

In use as the wheel rotates the tread sections 15 come in contact with the roadway, the torsional springs 25, through the medium of the lock levers 18 and arms 21, 31, constantly tending to force them outward and enabling the same to firmly grip the surface of the roadway to prevent skidding of the wheel and also to increase its traction. As illustrated in Fig. 1, when a tread section comes in contact with the road, its leading end is first moved radially inward in line with the tread face of the tire. This movement results in the corresponding lever 18 being rocked inwardly against the resistance of its spring 25 and the connecting arms 21, 31 rocking relatively thereto in a direction to separate them, as shown, there being a slight bending or flexing of the respective tread section from its center toward the leading end thereof. During this time, the companion lever 18 at the trailing end of the tread section is held against rocking by its arm 28 contacting with the stop 29, and the corresponding set of arms 21, 31 are therefore held rigidly in place and hence prevent that end of the tread section moving inwardly and in a direction circumferentially of the wheel. When the trailing end of said tread section comes in contact with the road, a reversal of these movements then takes place.

By yieldingly mounting the tread sections in the manner herein shown and described, the resistance of the springs is such as to press them against the roadway, insuring perfect traction and guarding against skidding of the vehicle, and yet allow them to yield to road obstructions. The lever and arm constructions, while permitting the necessary flexibility of the tread sections in response to road impacts received by them, prevent lateral as well as undue side-sway of said sections circumferentially of the wheel.

As shown in Fig. 5, the central corrugation or thread of each tread section 15 is closed on its open side by a reinforcing brace or tie plate 38, which may be welded or otherwise fastened at its ends to the adjacent portions of said section. By this provision, when a tread section is flexed or bent, as heretofore described, this flexure takes place from a point on either side of this reinforcing brace to one end or the other of the section.

In practice, the supporting members 16 are preferably so constructed as to take the place of the customary shims or lugs employed for retaining the demountable rim 13 on the wheel. To this end, each of said supporting members has formed thereon near the ends thereof, oppositely facing flanges or projections 39 and 40. The projections 39 are substantially wedge-shaped and are adapted to enter between the felly and rim for holding the latter in place, while the projections 40 are curved and adapted to engage the rim-flange, as shown in Fig. 2.

This improved flexible mounting is also applicable for use in connection with vehicle bumpers. In this embodiment of the invention, shown in Figs. 6–9 inclusive, 41 indicates a vehicle-frame having a transverse bar 42 joining its free ends. Instead of arranging the flexible units side by side, as in the arrangement heretofore described, they are disposed near the ends of the bar 42, each being mounted on a collar 43 carrying an upright fulcrum pin 44 at the upper end of which the rock lever 45 is attached. The latter is pivotally connected with the impact member or bumper 46 by the arms 47, 48 and link 49 in the same manner as the ends of tread sections are connected with their companion levers. Springs 50 are applied to the fulcrum pins for yieldingly resisting inward movement of the levers 45, their outward movement being limited by stop lugs 51 carried by the collars 43 and with which the inner arms 52 of said levers are adapted to engage.

When the bumper receives a blow at or near one end thereof, the lever 45 on that end yields in response thereto, while the companion lever at the opposite end is held rigid, as shown in Fig. 7. During this action, the bumper is moved a slight distance laterally to one side, the arms 47, 48 at that end of the bumper receiving the blow remaining closed and limiting such lateral movement, while the corresponding arms at the opposite end of the bumper swing inward, and become separated, causing the latter to move outward a corresponding distance. Should the bumper receive a blow centrally thereof, both levers 45 will yield and take the position shown in Fig. 8.

I claim as my invention:—

1. In a device of the character described, the combination of a support, an impact-receiving member, and means for connecting said member with said support, comprising yieldable means fulcrumed on said support for resisting movement of the impact-receiving member in one direction, and attaching arms connecting said yieldable means with said impact-receiving member, said arms being movable in one direction only relatively to said yieldable means.

2. In a device of the character described, the combination of a support, an impact-receiving member, and means for connecting said member with said support, comprising yieldable rock levers fulcrumed on the support to swing in one direction, attaching arms pivotally connecting said rock levers with the impact-receiving member, and means for restraining the swinging movement of said arms in one direction relatively to said rock levers.

3. In a device of the character described, the combination of a support, an impact-receiving member, and means for connecting said member with said support, comprising yieldable rock levers fulcrumed on the support to swing in one direction, attaching arms pivotally connecting said rock levers with the impact receiving member, and supplementary arms disposed alongside of and parallel with said attaching arms, the supplementary arms preventing the swinging of the latter in one direction relative to said rock levers and permitting such movement in the opposite direction.

4. In a device of the character described, the combination of a support, an impact-receiving member, and means for connecting said member with said support, comprising yieldable rock levers fulcrumed on the support to swing in one direction, attaching arms pivotally connecting said rock levers with the impact receiving member, supplementary arms disposed parallel with said attaching arms and each fulcrumed at one end on the corresponding rock lever and links pivotally connecting the free ends of said supplementary arms with the companion attaching arms.

5. In a device of the character described, the combination of a support, an impact-receiving member, and means for connecting the opposite ends of said member with said support, each of said means comprising a rock lever fulcrumed on said support, a spring applied to said lever for yieldingly resisting its movement in one direction, means for positively limiting the movement of said lever in the opposite direction, and an attaching arm pivotally connecting the impact-receiving member with the rock lever, said arm being free to swing inwardly relatively to said rock lever but restrained from swinging outwardly relatively thereto.

6. In a device of the character described, the combination of a support, an impact-receiving member, and means for connecting the opposite ends of said member with said support, each of said means comprising a rock lever fulcrumed on said support, a spring applied to said lever for yieldingly resisting its movement in one direction, means for positively limiting the movement of said lever in the opposite direction, an attaching arm pivotally connecting the impact-receiving member with the rock lever, a second arm disposed alongside the attaching arm and pivoted at one end to said rock lever between the fulcrum thereof and the pivot of said attaching arm, and a link pivotally connected to the other end of said second arm and to said attaching arm at a point intermediate the ends of the latter.

7. In a device of the character described, the combination of a support, an impact-receiving member, and means for connecting the opposite ends of said member with said support, each of said means comprising a rock lever fulcrumed on said support and having a stop arm thereon, a spring applied to said lever for yieldingly resisting its movement in one direction, a stop with which said stop arm normally engages for limiting the movement of the rock lever in the opposite direction, an attaching arm pivotally connecting the impact receiving member with the outer end of said rock lever, and means carried by said lever and connected with said attaching arm for preventing the latter from swinging outwardly beyond a predetermined point but permitting its swinging inwardly.

8. In a device of the character described, the combination of a support, an impact receiving member, and means for connecting said member with said support, comprising a pair of oppositely-facing rock levers fulcrumed on said support, torsional springs applied to said levers for yieldingly resisting their movement in one direction, a stop for positively limiting the movement of said levers in the opposite direction, a pair of parallel arms pivoted at their inner ends to each of said rock levers, one arm being longer than the other and pivoted at its outer end to the corresponding end of said impact-receiving member, and a link connecting the outer end of the short arm with the companion long arm.

9. A non-skidding attachment for vehicle wheels, comprising a supporting member adapted for attachment to the side of a vehicle wheel, a non-skidding tread-band carried by said member and movable radially of the wheel, and foldable jointed connections pivotally connecting said supporting member and said tread-band for yieldingly resisting the inward movement of the latter.

10. A non-skidding attachment for vehicle wheels, comprising a supporting member adapted for attachment to the side of a vehicle wheel, a non-skidding tread-band carried by said member and movable radially of the wheel, rock levers fulcrumed on said supporting member for yieldingly resisting the inward movement of said tread-band, and means for connecting said levers with said tread-band.

11. A non-skidding attachment for vehicle wheels, comprising a supporting member adapted for attachment to the side of a vehicle wheel, a non-skidding tread-band carried by said member and movable radially of the wheel, rock levers fulcrumed on said supporting member, resistance springs applied to said levers, and attaching arms pivotally connecting said levers with said tread band.

12. A non-skidding attachment for vehicle wheels, comprising a supporting member adapted for attachment to the side of a vehicle wheel, a non-skidding tread-band carried by said member and movable radially of the wheel, rock levers fulcrumed on said supporting member for yieldingly resisting the inward movement of said tread-band, attaching arms pivotally connecting said levers with said tread-band, and means for restraining the swinging movement of said arms in one direction relative to said rock levers.

13. A non-skidding attachment for vehicle wheels, comprising a supporting member adapted for attachment to the side of a vehicle wheel, a non-skidding tread-band carried by said member and movable radially of the wheel, rock levers fulcrumed on said supporting member for yielding resisting the inward movement of said tread-band, attaching arms pivotally connecting said levers with said tread-band, and supplementary arms arranged parallel with said attaching arms, said supplementary arms being joined at their ends to the companion rock levers and attaching arms, respectively.

14. A non-skidding attachment for vehicle wheels, comprising a supporting member adapted for attachment to the side of a vehicle wheel, a non-skidding tread-band carried by said member and movable radially of the wheel, rock levers fulcrumed on said supporting member for yieldingly resisting the inward movement of said tread-band, attaching arms pivotally connecting said levers with said tread-band, supplementary arms arranged parallel with said attaching arms and each fulcrumed at one end on the corresponding rock lever, and links pivotally connecting the opposite ends of said supplementary arms with the companion attaching arms.

15. A non-skidding attachment for vehicle wheels, comprising a supporting member adapted for attachment to the side of a vehicle wheel, a non-skidding tread-band carried by said member and movable radially of the wheel, rock levers fulcrumed on said supporting member, springs applied to said levers for resisting their movement in one direction, means for positively limiting the movement of said levers in the opposite direction, attaching arms pivotally connecting said levers with the ends of said tread-band and supplementary arms pivotally connecting said levers with said attaching arms for limiting the swinging movement of the latter in one direction.

16. A non-skidding attachment for vehicle wheels, comprising a supporting member adapted for attachment to the side of a vehicle wheel, a non-skidding tread-band carried by said member and movable radially of the wheel, a pair of oppositely-facing rock levers fulcrumed on said supporting member, springs applied to said levers for resisting their movement in one direction, a stop for limiting the movement of said levers in the opposite direction, attaching arms pivotally connecting the outer ends of said rock levers with the corresponding ends of said tread-band, and means for limiting the outward-swinging movement of said attaching arms relative to their companion levers, but permitting the inward-swinging movement thereof.

GEORGE A. LUNZ.